(12) United States Patent
Lee et al.

(10) Patent No.: US 12,286,999 B2
(45) Date of Patent: Apr. 29, 2025

(54) DEVICE FOR COMPENSATING FOR TOLERANCES BETWEEN TWO COMPONENTS TO BE CONNECTED TO ONE ANOTHER

(71) Applicant: Witte Automotive GmbH, Velbert (DE)

(72) Inventors: Glen Lee, Cologne (DE); Klaus Spickenheier, Iserlohn (DE)

(73) Assignee: Witte Automotive GmbH, Velbert (DE)

( * ) Notice: Subject to any disclaimer, the term of this patent is extended or adjusted under 35 U.S.C. 154(b) by 210 days.

(21) Appl. No.: 18/060,588

(22) Filed: Dec. 1, 2022

(65) Prior Publication Data

US 2023/0167841 A1 Jun. 1, 2023

(30) Foreign Application Priority Data

Dec. 1, 2021 (DE) ..................... 10 2021 213 630.3

(51) Int. Cl.
*F16B 5/02* (2006.01)
*F16B 37/04* (2006.01)

(52) U.S. Cl.
CPC ............ *F16B 5/025* (2013.01); *F16B 37/041* (2013.01)

(58) Field of Classification Search
CPC .. F16B 5/02; F16B 5/025; F16B 37/04; F16B 37/041; F16B 37/044; F16B 37/045; F16B 39/08; F16B 39/10; Y10S 411/97
USPC ................. 411/167, 172, 175, 190–191, 204
See application file for complete search history.

(56) References Cited

U.S. PATENT DOCUMENTS

| | | | | |
|---|---|---|---|---|
| 4,074,491 A | * | 2/1978 | Bell | ........................ B64C 1/06 411/116 |
| 4,219,064 A | * | 8/1980 | Lozano | ................. F16B 37/044 411/103 |
| 5,039,264 A | * | 8/1991 | Benn | ..................... F16B 37/041 411/523 |
| 5,339,500 A | * | 8/1994 | Muller | .................. F16B 37/041 24/514 |
| 5,893,694 A | * | 4/1999 | Wilusz | ................. F16B 37/044 411/112 |

(Continued)

FOREIGN PATENT DOCUMENTS

| | | |
|---|---|---|
| DE | 102004042564 A1 | 3/2006 |
| DE | 102018201496 A1 | 8/2019 |

(Continued)

OTHER PUBLICATIONS

German Patent and Trademark Office, Office Action in Application No. DE102021213630.3 dated Aug. 5, 2022, 6 pages, Munich, Germany.

*Primary Examiner* — Flemming Saether
(74) *Attorney, Agent, or Firm* — Marshall & Melhorn, LLC

(57) ABSTRACT

A device for compensating for tolerances between two components to be connected to one another may have a fastening element for fastening to a first component provided with an opening and for connecting the component to a second component. The device may also have at least two axial tolerance compensation stages for compensating axial tolerances between the two components. The at least two axial tolerance compensation stages are each arranged between the fastening element and one of the components.

13 Claims, 6 Drawing Sheets

(56) References Cited

U.S. PATENT DOCUMENTS

| | | | |
|---|---|---|---|
| 2005/0129481 A1* | 6/2005 | Wimmer | F16B 37/041 |
| | | | 411/433 |
| 2007/0224018 A1* | 9/2007 | DePerro | F16B 37/043 |
| | | | 411/175 |
| 2020/0173473 A1 | 6/2020 | Erpenbeck | |
| 2022/0299051 A1* | 9/2022 | Bente | F16B 5/0233 |
| 2024/0044349 A1* | 2/2024 | Bente | F16B 5/025 |

FOREIGN PATENT DOCUMENTS

| | | |
|---|---|---|
| WO | 2006024527 A1 | 3/2006 |
| WO | 2016126284 A1 | 8/2016 |

\* cited by examiner

DEVICE FOR COMPENSATING FOR TOLERANCES BETWEEN TWO COMPONENTS TO BE CONNECTED TO ONE ANOTHER

FIELD

The invention relates to a device for compensating for tolerances between two components to be connected to one another with a fastening element for a component, in particular for fastening to a body component of a vehicle, and to a tolerance-compensating element.

BACKGROUND

WO 2006/024527 A1 discloses a C-shaped clamping piece for attaching to a plate provided with an opening with two flat legs connected via a bow, an axially movable nut element being arranged between the two legs. The end of the nut part is fastened in an axially resilient manner to the leg facing away from the plate via several clasps extending from the end of the nut part to the leg.

SUMMARY

The object of the present invention is to specify a particularly easily constructed device for compensating for tolerances between two components to be connected to one another, in particular at least one plate-shaped component, which enables improved axial tolerance compensation.

According to the invention, the object is achieved by a device having the features of the claims.

Advantageous developments of the invention are the subject matter of the dependent claims.

The device according to the invention for compensating for tolerances comprises at least two components to be connected to one another and a fastening element for fastening to one of the components which is provided with an opening for connecting the component to a further component and at least two axial tolerance compensation stages for compensating for axial tolerances between the two components, each of which is arranged between the fastening element and one of the components.

In other words, the device is designed to compensate multiple times, in particular twice or in two stages in the axial direction, for tolerances between the two components to be connected to one another. As a result, a simple tolerance compensation device is provided which can be used variably and can easily and reliably compensate large axial component sizes of the two components to be connected to one another. In particular, the device enables a simple compensation of axial tolerances of plate-shaped components of different component thicknesses, it being possible for the different component thicknesses of the plate-shaped components to be compensated in stages or steps.

The device can for example comprise a first axial tolerance compensation stage and a second axial tolerance compensation stage. The first axial tolerance compensation stage can be designed, for example, as a first, in particular a multi-part, tolerance compensation element with at least one stationary base element and an axially movable compensating element. The second axial tolerance compensation stage can be designed, for example, as an axially resiliently mounted compensating element, in particular as a one-piece or multi-part axially resiliently mounted compensating element.

An alternative device according to the invention for compensating for tolerances between two components to be connected to one another can comprise at least one fastening element for fastening to a component, which is provided with an opening and is in particular plate-shaped, and for connecting the component to a further component and a tolerance compensation element, which is arranged between the fastening element and one of the components, the fastening element comprising at least two legs which are arranged one above the other while forming an intermediate space, a web which connects the two legs, and a first nut element which is arranged in the intermediate space between the two legs so as to be axially movable, a first leg having, at a free end, an extension which is formed as a spring arm, in particular bent inward, which is connected to a nut end in such a way that the first nut element is mounted axially resiliently between the two legs.

The advantages achieved with the invention consist, in particular, in the fact that, by means of such an extension in combination with the tolerance compensation element, which extension is designed as a spring arm bent inward, both a simple fastening element which can be produced cost-effectively, and a simple tolerance compensation device, is provided, which can be used variably and can compensate for large axial component sizes in a simple and reliable manner. In particular, the fastening element enables a secure clamping of plate-shaped components of different component thicknesses, the different component thicknesses of the plate-shaped component being able to be axially compensated or being compensated for by means of the axially movable first nut element and by means of the tolerance compensation element.

The tolerance compensation element can be arranged on a side of one of the legs facing away from the intermediate space. In particular, the tolerance compensation element is arranged on an outer side of one of the legs.

Furthermore, the free end of the inwardly bent spring arm can be supported on a support element which projects inward from the first leg in the direction of the first nut element. As a result, an axial compensation can be limited by means of the spring arm carrying the first nut element.

The axially resiliently mounted compensating element can be designed as a spring element, in particular a spring arm, and a holder for the first nut element. The axially resiliently mounted compensating element can be designed, for example, as an inwardly bent spring arm, which is connected to a nut end of the first nut element in such a way that the first nut element is mounted axially resiliently between the two legs.

The extension, which is designed, for example, as a spring arm, can lie on the one hand prior to assembly in a plane with the first leg and, on the other hand, can be bent into the intermediate space by 180° for mounting. In a state bent into the intermediate space, the spring arm can cause a spring force in the axial direction. In this case, the axial direction is perpendicular to the plane of the legs.

In particular, the spring arm can be arranged in the intermediate space parallel to the legs and in an axially resilient manner. For this purpose, the spring arm comprises, for example, a bending section and a resilient supporting section. The bending section is, for example, bendable in a range from 0° to 180°.

The fastening element is in particular designed as a C-shaped clamping element. The web connects the two legs, which in turn project perpendicularly from the web. The first nut element is provided for receiving a bolt, in particular a screw bolt. The bolt penetrates a through-opening in a second leg and the opening of the component, which can be inserted between the second leg and the first nut element.

Furthermore, the first nut element can be held non-rotatably on the web by a lateral arm. As a result, tilting when the connecting element is inserted into the first nut element is at least reduced or avoided.

In one possible development, at least one support element for the spring arm is provided on the first leg. In particular, the support element projects inward from the first leg towards the first nut element. For example, the support element is elastically deformable. In particular, the support element is designed as a resilient support element. For example, the support element is elastically deformable in such a way that a spring force can be provided by means of which the spring arm, which is in particular bent inward, is arranged or held in supporting contact.

In addition, the first nut element or an end of the inwardly bent spring arm pointing in the direction of the web can be designed such that this first nut element or the end of the spring arm is arranged in a region of the support element. For example, the first nut element, in particular a nut end of the first nut element facing away from the component, or the spring arm end is arranged at a distance from the support element in the non-mounted state. In particular when inserting the component, in particular the plate-shaped component, into the fastening element or when the component is held in the fastening element, the first nut element or the spring arm end strikes the support element to limit the component thickness. Thus, components of different component thicknesses can be fastened to a further component by means of the fastening element.

Another aspect provides for a second nut element or the tolerance compensation element on the outside of one of the two legs. The second nut element or the tolerance compensation element is arranged axially fixedly. This enables a secure connection of the in particular plate-shaped component to a further component that compensates for axial component tolerances.

In one possible embodiment, the two legs are of different thicknesses. For example, the first leg is formed thinner than the second leg. Furthermore, the spring element is formed thinner than the first leg.

The fastening element can, for example, be monolithically formed. In particular, the fastening element is a monolith, for example an injection molding element made of plastics material.

Alternatively, the fastening element can be formed in several parts, the web, the first leg with the spring arm and the first nut element forming a first assembly component, and the second nut element or the tolerance compensation element forming a second assembly component with or without the second leg, which is arranged on the web, in particular is held on the web in a form-fitting and/or force-fitting manner. In this case, the second assembly component is designed both as a second leg and as a second nut element or tolerance compensation element and is in particular held on the web in a form-fitting and/or force-fitting manner.

In such a multipart embodiment, the first nut element serves as a tolerance compensation element (also referred to as a compensation element for short), in particular for compensating axial component tolerances, in particular different component thicknesses of the plate-shaped component to be fastened. The second nut element is arranged axially fixedly and serves to securely connect the plate-shaped component to a further component. Instead of the second nut element, a further tolerance compensation element with at least one stationary base element and an axially movable compensation element is preferably provided, which compensates axial component tolerances.

DESCRIPTION OF THE FIGURES

Embodiments of the invention are explained in greater detail with reference to the drawings, in which.

DETAILED DESCRIPTION

Parts corresponding to one another are provided with the same reference signs in all the drawings.

Figure 1A:
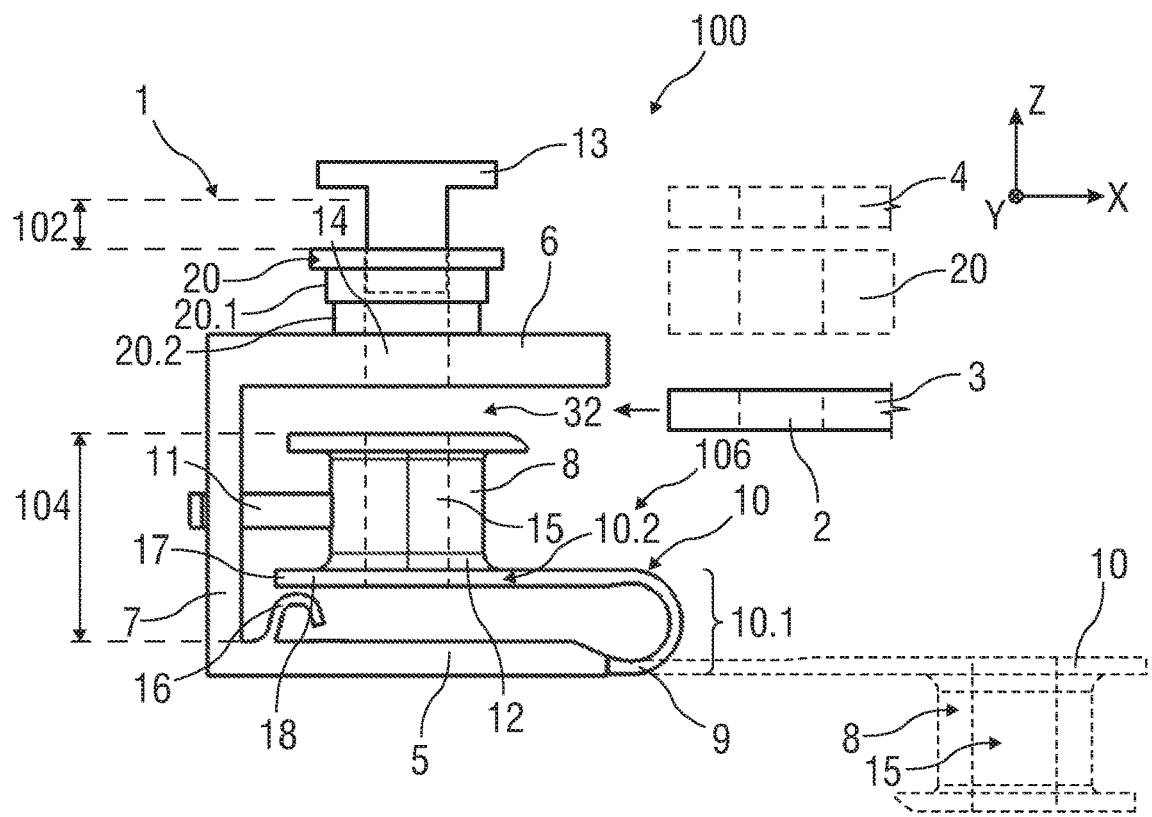
FIG. 1A is a schematic exploded view of an embodiment of a device according to the invention for repeatedly compensating for tolerances with an, in particular monolithic, fastening element with a single spring arm, which is in particular bent inward, as an extension of a first leg and a support element for the spring arm as a first axial tolerance compensation and a tolerance compensation element as a second axial tolerance compensation.

FIG. 1A schematically shows an exploded view of an embodiment of a device 100 for compensating for tolerances between two components 3 and 4 to be connected to one another. The device 100 comprises at least one fastening element 1 and at least two axial tolerance compensation stages 102 and 104 for the multi-stage compensation of axial tolerances between the two components 3 and 4 to be connected to one another.

The respective axial tolerance compensation stages 102, 104 are in particular each arranged between the fastening element 1 and one of the components 3, 4.

For example, a first axial tolerance compensation stage 102 can be designed as a tolerance compensation element 20. A second axial tolerance compensation stage 104 can be designed as an axially resiliently mounted compensating element 106.

Figure 5:
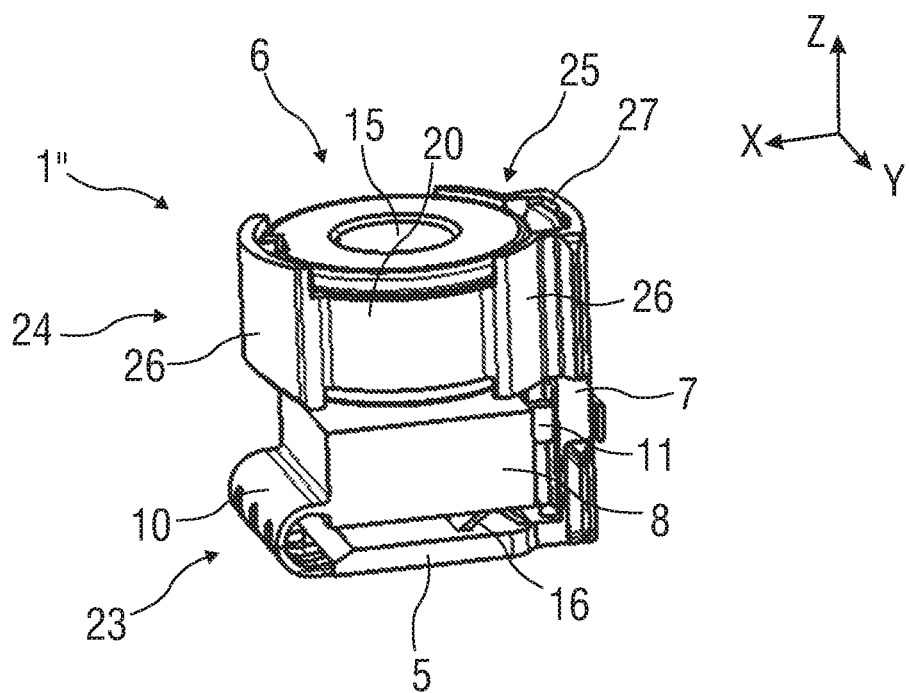
FIG. 5 shows a schematic perspective view of an embodiment of a device according to the invention with an, in particular multi-part, fastening element and a tolerance compensation element.
Figure 6:
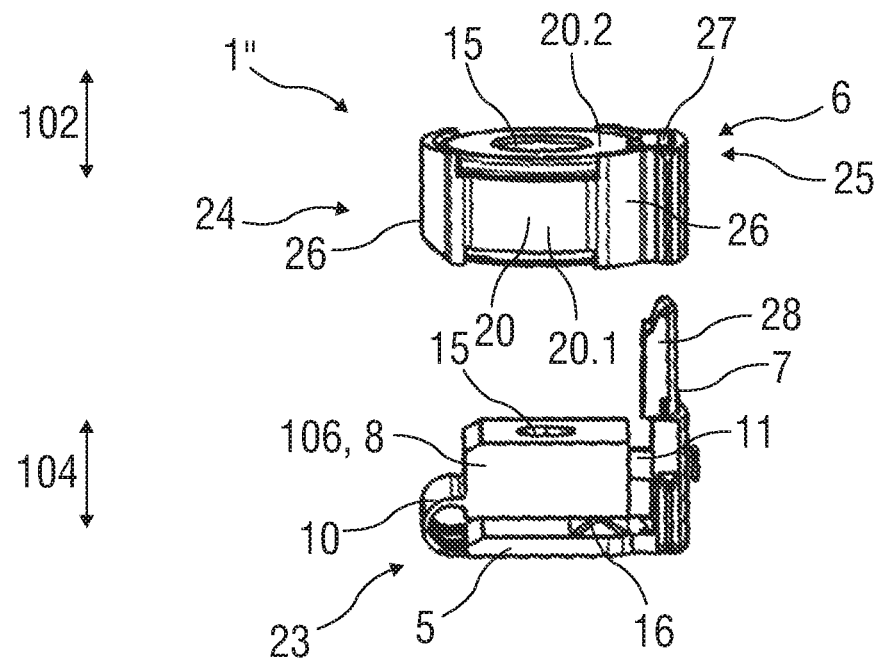
FIG. 6 shows a schematic side view of the further embodiment of the device according to the invention with the, in particular multi-part, fastening element according to FIG. 5.

The fastening element 1 can be constructed in one or more parts, and can be formed, for example, from a metal or plastic material or from a combination of metal parts and plastic parts. FIGS. 1A to 4 show a monolithic fastening element 1. FIGS. 5 and 6 show a multi-part fastening element 1.

The fastening element 1 serves for fastening to a component 3 provided with an opening 2, in particular a plate-shaped component 3, and optionally for connecting the component 3 to a further component 4. The plate-shaped component 3 is, for example, a carrier component, in particular a body panel of a vehicle. Such plate-shaped components 3 can have different component thicknesses due to production technology. The fastening element 1 is designed as a U-shaped clamping element that can axially compensate for such different component thicknesses of the plate-shaped component 3.

The tolerance compensation element 20 is a conventional compensation element and is designed identically in all the following different embodiments. Instead of the tolerance compensation element 20, a second nut element 20 (shown in dashed lines) can also be provided.

In the following, the function, the structure and the mode of operation of the tolerance compensation element 20 are generally claimed for all embodiments according to FIGS. 1A to 8:

The tolerance compensation element 20 comprises, for example, at least one base element 20.1 (also called base body), in particular a stationary base element 20.1, and an axial compensating element 20.2, for example metal threaded sleeves, which are in a threaded engagement, for example, a left-hand threaded engagement. A spring element (not shown in greater detail) is usually arranged in the axial compensation element 20.2 and creates a frictional connection between a bolt 13 (also referred to as connecting element or screw bolt or connecting screw), which is passed through the device 100 and has a further thread (right-hand thread), and the axial compensation element 20.2, so that when the bolt 13 is tightened, for example rotated, a torque is exerted on the axial compensation element 20.2, which causes axial unscrewing of the compensation element 20.2 from the base element 20.1 against the insertion direction of the bolt 13 and thus compensates for axial tolerances between the components 3 and 4.

The fastening element 1 comprises at least two legs 5, 6 with a first leg 5 and a second leg 6 and a web 7 that connects the two legs 5, 6. The two legs 5, 6 are arranged one above the other to form an intermediate space 32. The two legs 5, 6 are arranged substantially parallel one above the other and spaced apart from one another.

Furthermore, the fastening element 1 comprises a first nut element 8 which is arranged axially movably in the intermediate space 32 between the two legs 5 and 6. The nut element 8 is held non-rotatably or rotationally fixedly on the web 7 by a lateral arm 11.

At a free end, the first leg 5 has an extension 9 which is designed as an axially resiliently mounted compensation element 106 and holder for the first nut element 8. The extension 9 can be designed, for example, as a spring arm 10. The spring arm 10 is bent inward. In particular, the spring arm 10 is bent away from the first leg 5, inward in the direction of the first nut element 8, and is connected thereto. For example, the first nut element 8 is held elastically in the axial direction by means of the spring force of the spring arm 10.

The inwardly bent spring arm 10 is connected in particular to a first nut end 12 in such a way that the nut element 8 is mounted axially resiliently between the two legs 5 and 6.

In this case, the nut element 8 is connected to a single spring arm 10, which is in particular bent inward, as an extension 9 of the first leg 5. The spring arm 10 is designed, for example, as a thin spring strip, in particular a thin spring strip made of plastics material. The spring arm 10 has a thinner thickness than the first leg 5.

The web 7 connects the two legs 5 and 6. The two legs 5 and 6 protrude perpendicularly from the web 7. The first nut element 8 is provided for receiving the bolt 13, in particular a connecting bolt, for example a screw bolt.

The bolt 13 penetrates through a through-opening 14 in the second leg 6 and the opening 2 of the component 3. The first nut element 8 can be provided with a connection opening 15, for example a threaded opening with an internal thread or clamping opening with an inner clamping profile, into which the bolt 13 can be inserted and held in a form-fitting and/or force-fitting manner in the inserted state. For example, the bolt 13 can be screwed into the threaded opening or clamped or locked into the clamping opening. The bolt 13 has an accordingly corresponding external thread or an accordingly corresponding clamping profile.

The tolerance compensation element 20 as the first axial tolerance compensation stage 102 is arranged on a side of the leg 6 facing away from the intermediate space 32. In other words, the tolerance compensation element 20 is arranged on an outer side, on the leg 6. In particular, the tolerance compensation element 20 can be fastened, in particular detachably fastened, to the leg 6. Alternatively or additionally, the tolerance compensation element 20 can be arranged and fastened on the other leg 5, on the outer side (not shown).

The component 3 can be inserted between the second leg 6 and the first nut element 8. The through-opening 14, the opening 2 of the component 3 and the connection opening 15 are arranged one above the other for inserting the bolt 13 and form an opening channel for inserting and connecting the bolt 13 to the first nut element 8. In this case, both the through-opening 14 and the opening 2 of the component 3 can optionally be provided with connection structures or connecting profiles, in particular an internal thread or a clamping profile.

In addition, the first leg 5 has a support element 16 which projects inward from the first leg 5 in the direction of the first nut element 8.

In particular, the support element 16 projects inward from the first leg 5 in the direction of the first nut element 8. For example, the support element 16 is elastically deformable. In particular, the support element 16 is designed as a resilient support element 16. For example, the support element 16 is elastically deformable in such a way that a spring force can be provided, by means of which the spring arm 10, which is in particular bent inward, is arranged or held in supporting contact.

For this purpose, the support element 16 is designed as a freely projecting spring element, in particular a U-shaped spring element. The support element 16 is connected by one end to the first leg 5. An opposite free end of the support element 16 is arranged at a distance from the first leg 5.

In this case, the first nut element 8 and/or a spring arm end 17, which faces in the direction of the web 7, of the spring arm 10, which is in particular bent inward, can be designed such that this first nut element 8, in particular a flange 18, or the spring arm end 17 of the spring arm 10 is arranged in a region of the support element 16.

For example, the first nut element 8, in particular a nut end 12 of the first nut element 8 facing away from the component 3, or the spring arm end 17 is arranged at a distance from the support element 16 in the non-mounted state. In particular when inserting the in particular plate-shaped component 3 into the fastening element 1 or when the component 3 is held in the fastening element 1, the first nut element 8 or the spring arm end 17 strikes the support element 16 to limit the component thickness. The further component 4 can be arranged or is arranged in particular between the tolerance compensation element 20 and the bolt 13. The further component 4 has a through-opening 14 for receiving the bolt 13.

The spring arm 10 carrying the first nut element 8 serves for a first compensation of tolerances, in particular of axial tolerances of the in particular plate-shaped component 3. The spring arm 10 forms the axially resiliently mounted compensation element 106 of the second axial tolerance compensation stage 104.

The tolerance compensation element 20 as the first axial tolerance compensation stage 102 serves to further compensate for tolerances, in particular axial tolerances between the components 3 and 4. For this purpose, the compensation element 20.2 is arranged axially movably in the base element 20.1.

Thus, in the device 100 according to the invention, components 3 with different component thicknesses can be fastened to the further component 4 by means of the fastening element 1, and additionally axial component tolerances between the two components 3 and 4 can be compensated by means of the axially resiliently mounted compensating element 106 of the fastening element 1 and by means of the tolerance compensation element 20.

The two legs 5 and 6 can be of different thicknesses. For example, the first leg 5 is thinner than the second leg 6. Furthermore, the spring element or the spring arm 10 can be designed to be thinner than the first leg 5. Such a design of the spring element or spring arm 10 enables a simple bending of the spring arm 10.

On the one hand, the spring arm 10 can lie in a plane with the first leg 5 before assembly (shown in dashed lines) and, on the other hand, can be bent by 180° into the intermediate space 32 for assembly (shown in solid lines).

Because the arrangement of the spring arm 10 lies in a plane with the first leg 5 before assembly, the first nut element 8 can be provided in a separate step with a thread in the connection opening 15 in a simple manner.

The fastening element 1 and the first nut element 8 are manufactured, for example, in an injection molding process as a monolith, the first nut element 8 not yet comprising an internal thread. This internal thread of the first nut element 8 can be cut into the first nut element 8 after the injection molding process, in a separate step. Due to the arrangement of the spring arm 10 before assembly in a plane with the first leg 5, the first nut element 8 is easily accessible for a threaded mandrel or a thread cutter (not shown).

In a state bent into the intermediate space 32, the spring arm 10 can bring about a spring force in the axial direction. In this case, the axial direction is perpendicular to the plane of the legs 5, 6.

In particular, the spring arm 10 can be arranged in the intermediate space 32 in parallel with the legs 5, 6 and axially resiliently. For this purpose, the spring arm 10 comprises, for example, a bending section 10.1 and a resilient supporting section 10.2. The bending section 10.1 is, for example, bendable in a range from 0° to 180°. The supporting section 10.2 is configured to carry the first nut element 8.

Figure 1B:
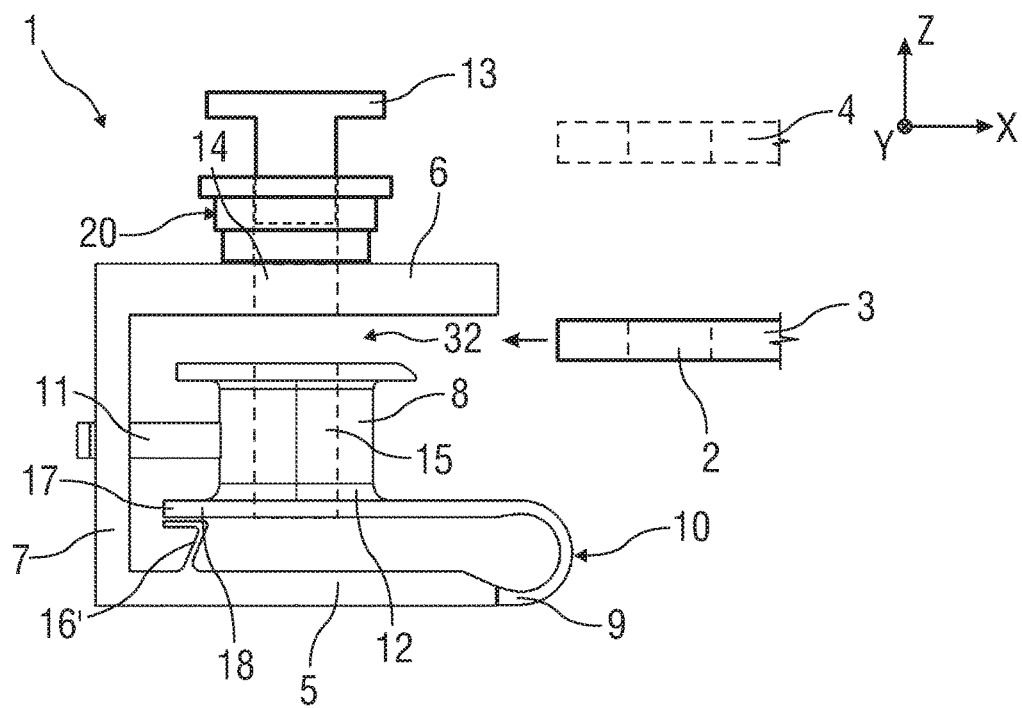
FIG. 1B schematically shows an exploded view of a further embodiment of a device according to the invention for compensating for tolerances with a fastening element according to the invention, in particular a monolithic fastening element, with a single spring arm, which is in particular bent inward, as an extension of a first leg, and an alternative support element for the spring arm as a first axial tolerance compensation and a tolerance compensation element as a second axial tolerance compensation.

FIG. 1B schematically shows an exploded view of a further embodiment of the device 100 with the tolerance compensation element 20 and the fastening element 1 with the single spring arm 10, which is in particular bent inward, as an extension of the first leg 5 and an alternative support element 16' for the spring arm 10. The alternative support element 16' is designed as an L- or 7- or Z-shaped spring element. In this case, a horizontal surface of the alternative support element 16' is arranged largely in parallel with the spring arm end 17 of the spring arm 10.

Figure 1C:
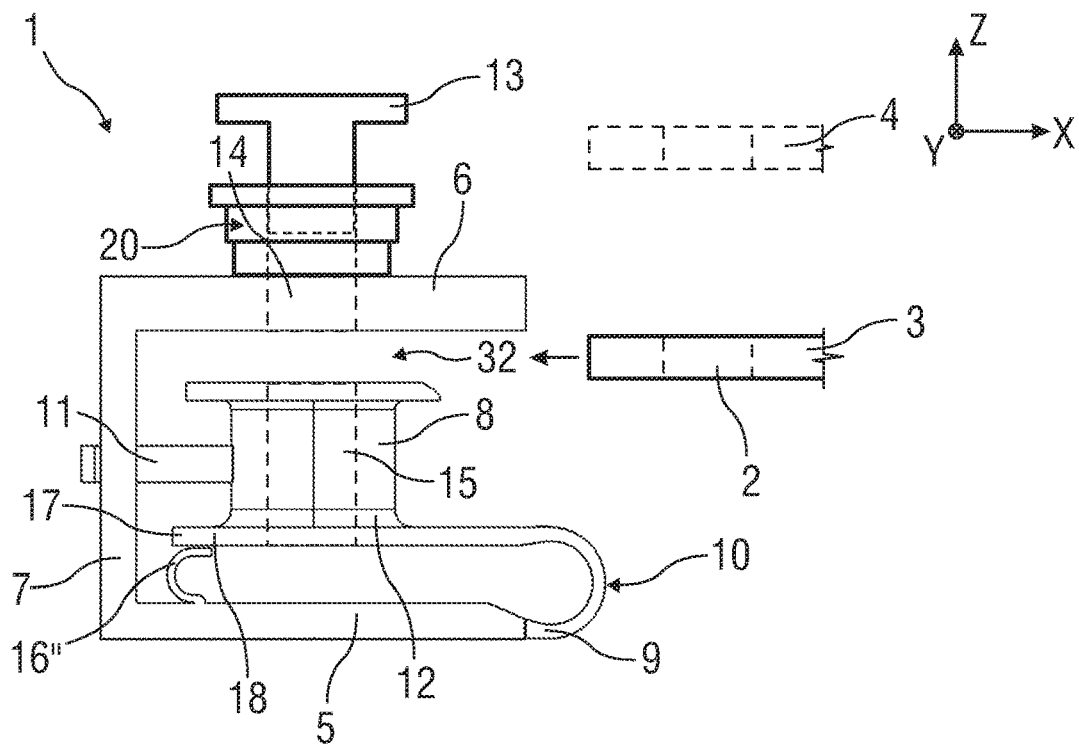
FIG. 1C schematically shows an exploded view of an embodiment of a device according to the invention for compensating for tolerances with a fastening element according to the invention, in particular a monolithic fastening element, with a single spring arm, which is in particular bent inward, as an extension of a first leg and a further alternative support element for the spring arm as a first axial tolerance compensation and a tolerance compensation element as a second axial tolerance compensation.

FIG. 1C schematically shows an exploded view of a further embodiment of the device 100 with the tolerance compensation element 20 and the fastening element 1 with the single spring arm 10, which is in particular bent inward, as an extension of the first leg 5 and a further alternative support element 16" for the spring arm 10. The further alternative support element 16" is designed as a C-shaped spring element.

Figure 2:
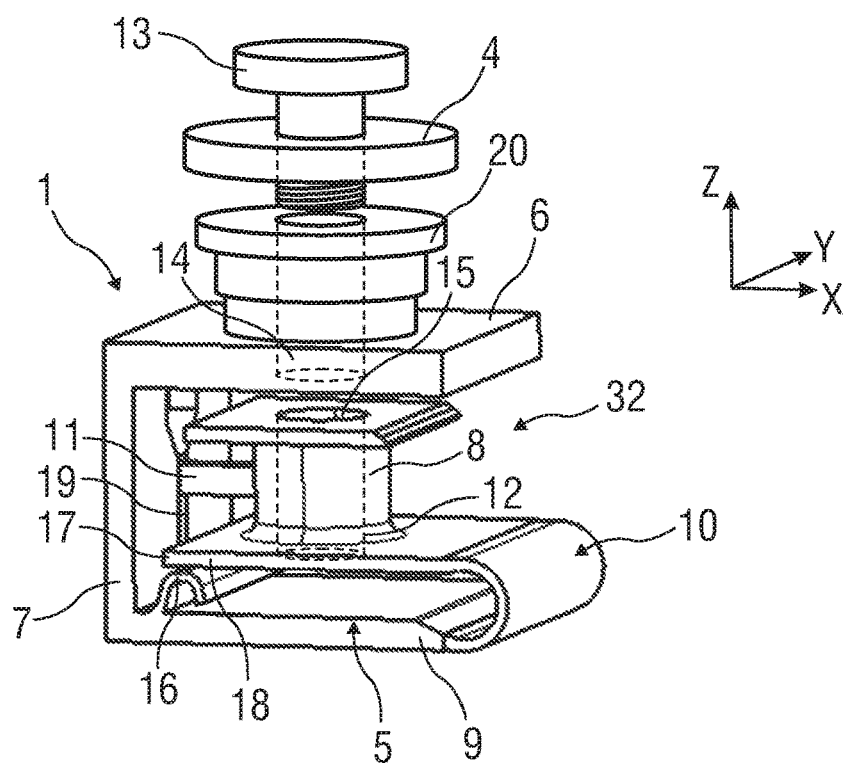
FIG. 2 schematically shows in perspective view the device according to the invention according to FIG. 1A with the fastening element and the tolerance compensation element.

FIG. 2 schematically shows a perspective view of the device 100 according to the invention according to FIG. 1A with the fastening element 1 and the tolerance compensation element 20 for axial tolerance compensation on the component 3 or between the components 3 and 4.

For the rotationally secured arrangement of the first nut element 8, the web 7 has a recess 19, in particular a slot or a groove, in particular a longitudinal slot or a longitudinal groove. The lateral arm 11 is formed as a fixed strip or a strip-shaped plate, which is arranged in a firmly bonded, form-fitting and/or force-fitting manner, in particular fastened, glued, clipped, latched, in the recess 19.

The fastening element 1 is in particular made of a material, in particular a plastics material. The fastening element 1 is formed monolithically.

Figure 3:
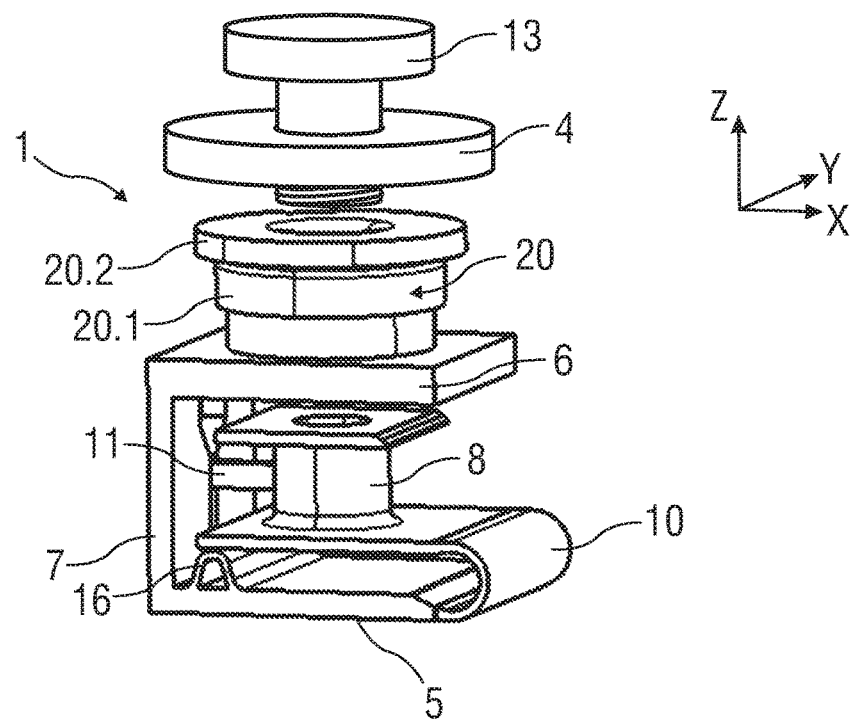
FIG. 3 schematically shows a perspective view of a development of the device of the fastening element according to FIG. 1A with the tolerance compensation element.

FIG. 3 schematically shows a perspective view of a development of the fastening element 1 according to the invention according to FIG. 1. In addition to the first nut element 8, the fastening element 1 comprises a second axially fixed nut element or the tolerance compensation element 20 with the stationary base element 20.1 and the axially movable compensation element 20.2. Instead of the C- or Z-shaped support element 16, 16', 16" according to FIGS. 1A to 1C and thus support open on one side, the support element 16 according to FIG. 3 is U-shaped and connected with both ends to the first leg 5.

Figure 4:
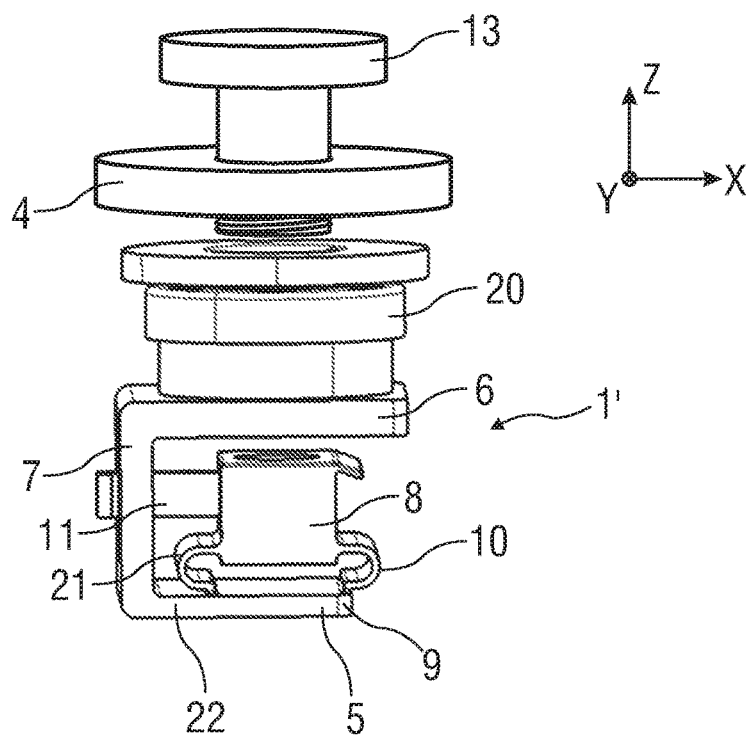
FIG. 4 shows a schematic side view of a further embodiment of a device according to the invention with an, in particular one-piece, fastening element and a tolerance compensation element.

FIG. 4 schematically shows a side view of a further embodiment of the device 100 with an alternative fastening element 1' with the spring arm 10 and with the tolerance compensation element 20. Instead of the tolerance compensation element 20, a second axially fixed nut element (not shown) can also be provided, so that axial tolerances can only be compensated by the resilient first nut element 8 (not shown in detail). The fastening element 1' is formed monolithically.

Instead of the support element 16, the first leg 5 comprises a further bent spring arm 21, which extends from the first leg 5 in bent form from the leg end 22 pointing in the direction of the web 7, and is connected to the first nut element 8.

FIG. 5 schematically shows a perspective view of an embodiment of the device 100 with an in particular multi-part fastening element 1" according to the invention and the tolerance compensation element 20 according to FIGS. 1A to 4.

FIG. 6 schematically shows a side view of the further embodiment of the device 100 with an in particular multi-part fastening element 1" according to the invention according to FIG. 5 and the tolerance compensation element 20 according to FIGS. 1A to 5.

The fastening element 1" is formed in multiple parts. In this case, the web 7, the first leg 5 with the spring arm 10, and the first nut element 8, form a first assembly component 23. The second nut element or the tolerance compensation element 20 forms the second leg 6 and a second assembly component 24.

The second nut element or the tolerance compensation element 20 is arranged and held on the web 7 by means of a fastening element 25 in a form-fitting and/or force-fitting manner, for example by means of clamping jaws 26 or clips in combination with a fastening groove 27. The web 7 comprises a fastening guide 28 accordingly corresponding to the fastening groove 27.

In such a multi-part embodiment, the first nut element 8, held axially resiliently on the spring arm 10, serves as an axial compensation element 106 of the second axial tolerance compensation stage 104, in particular for compensating axial component tolerances, in particular different component thicknesses of the plate-shaped component 3 to be fastened.

The tolerance compensation element 20 comprises the axially stationary base element 20.1 and the axially movable compensation element 20.2 and serves to axially compensate for tolerances between the plate-shaped component 3 and the further component 4 of the first axial tolerance compensation stage 102. The base element 20.1 of the tolerance compensation element 20 is arranged axially fixedly and serves for secure connection to the fastening element 1". The compensation element 20.2 serves to compensate axial tolerances between the plate-shaped component 3 with the further component 4 and is arranged axially movably relative to the base element 20.1.

Figure 7:
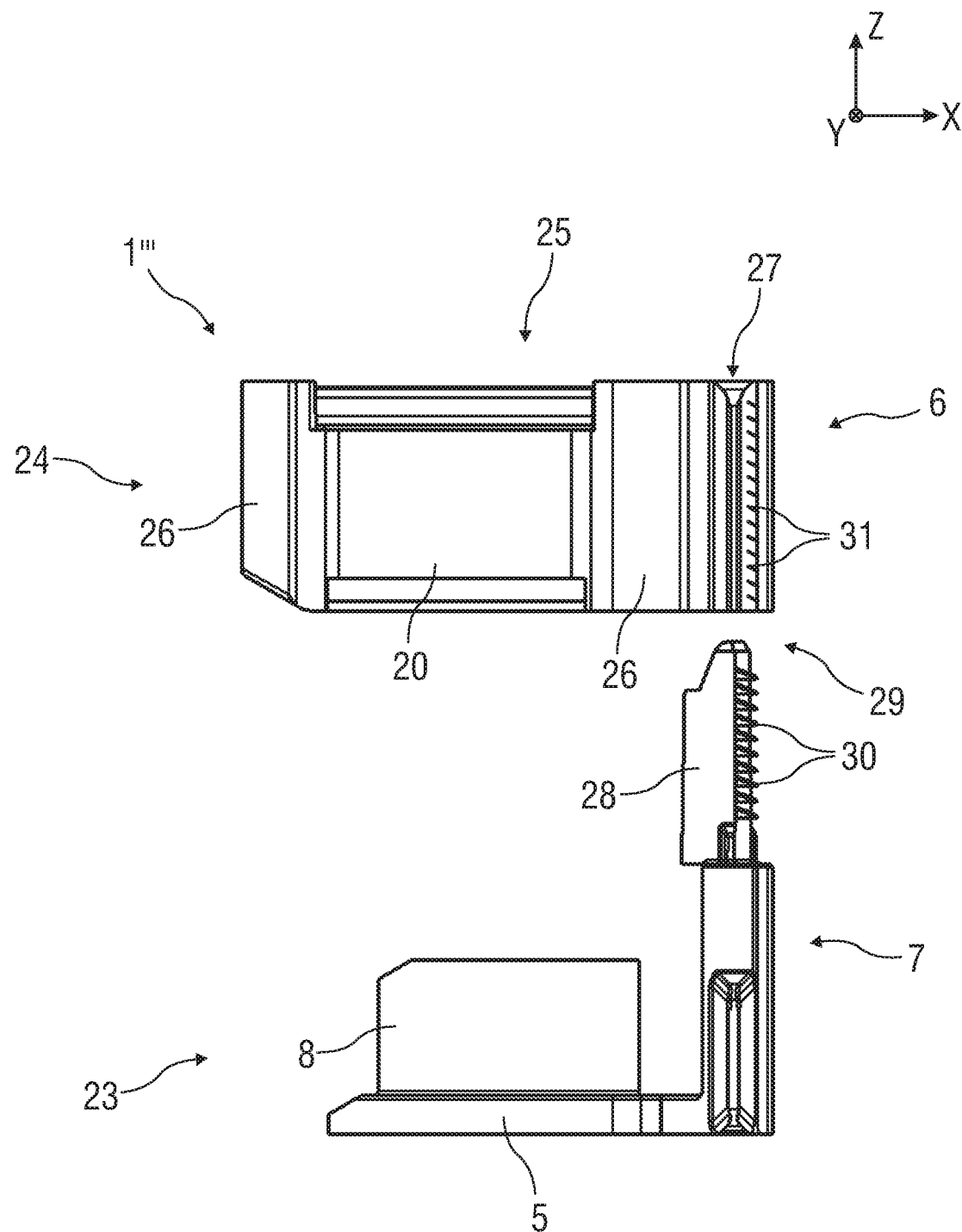
FIG. 7 schematically shows a side view of an embodiment of a device according to the invention with an, in particular multi-part, fastening element with height adjustment and tolerance compensation element.

FIG. 7 schematically shows a side view of an embodiment of a further device 100 according to the invention with an in particular multi-part fastening element 1''' with height adjustment. The fastening element 1''' differs from the fastening element 1" according to FIGS. 5 and 6 in the manner of the web 7 and the fastening guide 28. In addition, the fastening element 1''' comprises a latching connection 29 for adjusting the height of the first assembly component 23 and the second assembly component 24 relative to one another. Instead of a latching connection 29, an alternative releasable connection allowing for a height adjustment can also be provided.

For example, the fastening guide 28 comprises a number of latching grooves 30 which latch into corresponding latching lugs 31 in the vertical fastening groove 27 or vertical through-opening of the second assembly component 24. Alternatively, the latching grooves 30 can be arranged in the vertical fastening groove 27 or the vertical through-opening, and the latching lugs 31 can be arranged on the fastening guide 28.

Figure 8:
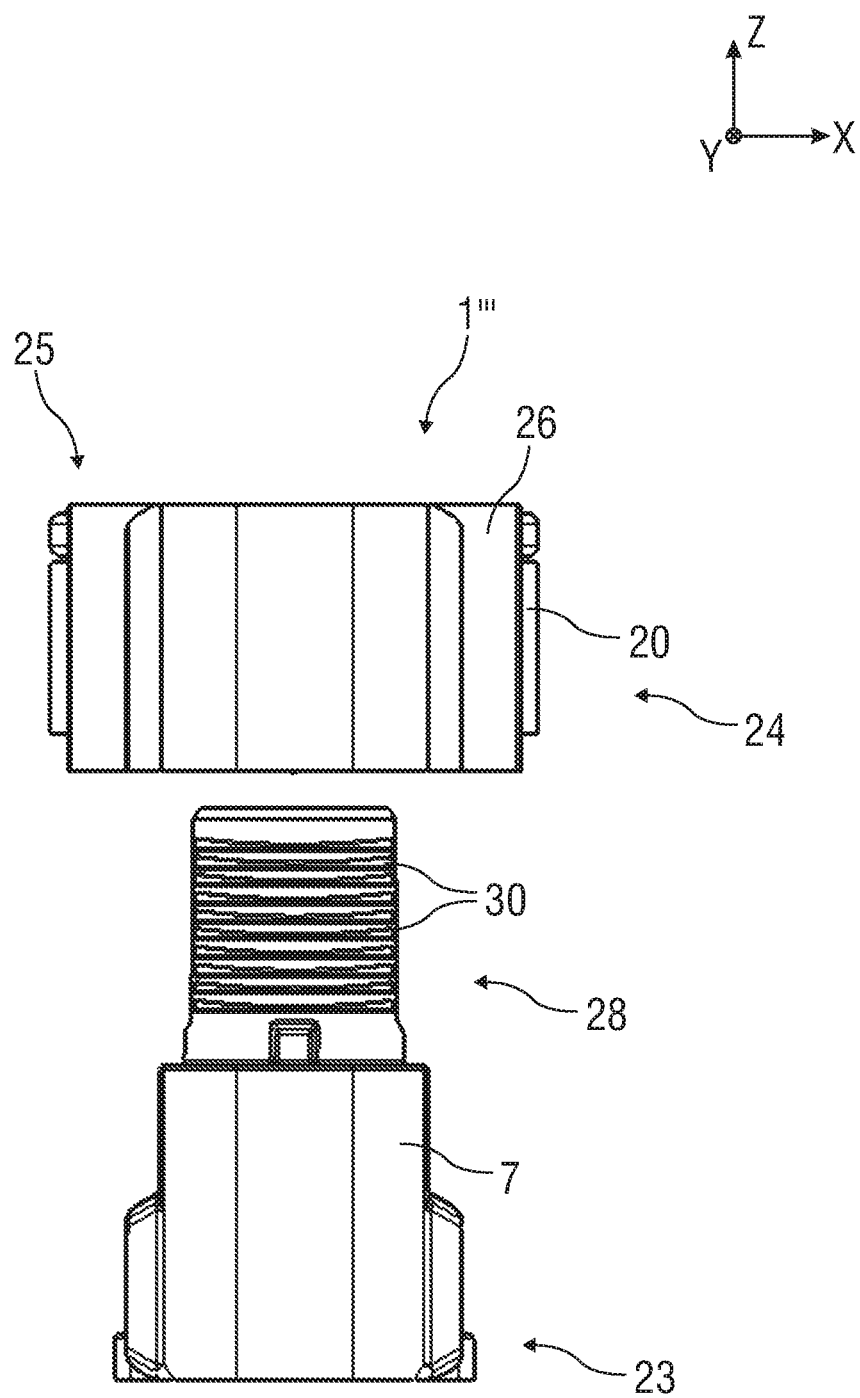
FIG. 8 schematically shows, in a further side view, the embodiment of the device according to FIG. 7 with the multi-part fastening element with height adjustment and the tolerance compensation element.

FIG. 8 schematically shows a further side view of the embodiment of the device 100 according to FIG. 7 with the multi-part fastening element 1''' with height adjustment according to FIG. 7.

LIST OF REFERENCE SIGNS 1, 1', 1", 1''' fastening element
2 opening
3 component
4 further component
5 first leg
6 second leg
7 web
8 first nut element
9 extension
10 bent spring arm
10.1 bending section
10.2 supporting section
11 lateral arm
12 first nut end
13 bolt
14 through-opening
15 connecting opening
16 support element
16', 16" alternative support element
17 spring arm end
18 flange
19 recess
20 second nut element/tolerance compensation element
20.1 base element
20.2 compensation element
21 further bent spring arm
22 leg end pointing in the direction of the web
23 first assembly component
24 second assembly component
25 fastening element
26 clamping jaws
27 fastening groove
28 fastening guide
29 latching connection
30 latching groove
31 latching lug
32 intermediate space
100 device for compensating tolerances
102 first axial tolerance compensation stage
104 second axial tolerance compensation stage
106 axially resiliently mounted compensation element

What is claimed is:

1. A device for compensating for tolerances between two components to be connected to one another, comprising:
   the two components to be connected to one another,
   a fastening element for fastening to one of the two components provided with an opening and for connecting this component to the other of the two components, and
   at least two axial tolerance compensation stages for compensating axial tolerances between the two components,
   wherein the at least two axial tolerance compensation stages are each arranged between the fastening element and one of the two components,
   wherein the fastening element comprises two legs which are arranged one above the other to form an intermediate space, a web connecting the two legs, a first nut element which is arranged axially movably in the intermediate space between the two legs.

2. The device according to claim 1, wherein the first axial tolerance compensation stage is designed as a tolerance compensation element with at least one stationary base element and an axially movable compensating element.

3. The device according to claim 2, wherein the tolerance compensation element is arranged on a side of one of the two legs facing away from the intermediate space.

4. The device according to claim 1, wherein the second axial tolerance compensation stage is designed as an axially resiliently mounted compensation element.

5. The device according to claim 1, wherein a first leg has an extension at a free end which is designed as an axially resiliently mounted compensation element and holder for the first nut element.

6. The device according to claim 5, wherein the axially resiliently mounted compensation element is designed as a spring arm, which is bent inward and is connected to a first nut end of the first nut element in such a way that the first nut element is mounted axially resiliently between the two legs.

7. The device according to claim 6, wherein the free end of the inwardly bent spring arm can be supported on a support element which projects inward from the first leg in the direction of the first nut element.

8. The device according to claim 7, wherein the spring arm on the one hand lies in a plane with the first leg before assembly, and on the other hand can be bent by 180° into the intermediate space for mounting.

9. The device according to claim 8, wherein the spring arm causes a spring force in the axial direction, in a state bent into the intermediate space.

10. The device according to claim 9, wherein the axial direction is perpendicular to the plane of the legs.

11. The device according to claim 10, wherein the spring arm is arranged in the intermediate space parallel to the legs, and in an axially resilient manner.

12. The device according to claim 11, designed in several parts, wherein the web, the first leg with the spring arm, and the first nut element form a first assembly component, and the tolerance compensation element forms a second assembly component with or without the second leg, which second assembly component is releasably arranged on the web.

13. The device according to claim 1, wherein the fastening element is designed as a monolith.

* * * * *